(12) United States Patent
Marupaduga

(10) Patent No.: US 11,653,239 B1
(45) Date of Patent: May 16, 2023

(54) DYNAMIC CHANNEL STATE INFORMATION REPORTING ADJUSTMENT ON PRIMARY AND SECONDARY PATHS

(71) Applicant: Sprint Spectrum LP, Overland Park, KS (US)

(72) Inventor: Sreekar Marupaduga, Overland Park, KS (US)

(73) Assignee: Sprint Spectrum LLC, Overland Park, KS (US)

( * ) Notice: Subject to any disclaimer, the term of this patent is extended or adjusted under 35 U.S.C. 154(b) by 192 days.

(21) Appl. No.: 16/939,402

(22) Filed: Jul. 27, 2020

(51) Int. Cl.
*H04W 24/10* (2009.01)
*H04W 52/36* (2009.01)
*H04W 76/16* (2018.01)
*H04W 52/34* (2009.01)
*H04W 52/24* (2009.01)

(52) U.S. Cl.
CPC ......... *H04W 24/10* (2013.01); *H04W 52/241* (2013.01); *H04W 52/346* (2013.01); *H04W 52/365* (2013.01); *H04W 52/367* (2013.01); *H04W 76/16* (2018.02)

(58) Field of Classification Search
None
See application file for complete search history.

(56) References Cited

U.S. PATENT DOCUMENTS

| | | | |
|---|---|---|---|
| 8,559,328 B2 | 10/2013 | Tan et al. | |
| 9,001,747 B2 | 4/2015 | Ojala et al. | |
| 10,608,708 B2 | 3/2020 | Park et al. | |
| 2016/0308652 A1* | 10/2016 | Sun | H04L 5/0051 |
| 2017/0150384 A1* | 5/2017 | Rune | H04W 72/085 |
| 2020/0329485 A1* | 10/2020 | Tsai | H04W 52/262 |
| 2022/0182869 A1* | 6/2022 | Eriksson | H04W 24/10 |

* cited by examiner

*Primary Examiner* — Jenkey Van
(74) *Attorney, Agent, or Firm* — Jones Robb, PLLC

(57) ABSTRACT

Systems and methods are provided for dynamically changing a channel state information (CSI) reporting protocol by adjusting CSI reporting frequency for a wireless device communicating with an access node within a wireless network. The methods and systems identify a power headroom (PHR) value at a particular wireless device and adjust the CSI reporting frequency when the PHR satisfies a predetermined threshold. The method changes the CSI reporting frequency for the wireless device to enable more frequent CSI reporting over a primary path to the access node to facilitate reallocation of resources.

20 Claims, 6 Drawing Sheets

DYNAMIC CHANNEL STATE INFORMATION REPORTING ADJUSTMENT ON PRIMARY AND SECONDARY PATHS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Further, different types of access nodes may be implemented for deployment for the various RATs. For example, an eNodeB may be utilized for 4G RATs and a gNodeB may be utilized for 5G RATs. Deployment of the evolving RATs in a network provides numerous benefits. For example, newer RATs may provide additional resources to subscribers, faster communications speeds, and other advantages.

To ensure consistent coverage through a wide geographic range, existing technologies such as 4G can be used in combination with newer technologies such as 5GNR. In an E-UTRAN New Radio-Dual Connectivity (EN-DC) configuration, wireless devices connect to an LTE eNodeB and 5G gNodeB. One node may act as a master node and the other as a secondary node. Thus, EN-DC allows devices to access both LTE and 5G simultaneously. In an EN-DC cell, more uplink noise or high received signal strength indicator (RSSI) may exist because 5G UEs are connecting to both the LTE node and 5G node. Access to high data speeds is improved if a high signal to interference and noise ratio (SINR) is present.

In an EN-DC network with multiple channel allocations for a wireless device, the wireless device utilizes a primary path and a secondary path. The identification of the primary path and the secondary path is based on the total volume of data transmitted. The path over which the larger percentage of data is transmitted is the primary path and the path over which the smaller percentage of data is transmitted is the secondary path.

In cases in which a wireless device is transmitting a large amount of data at a high power, the wireless device may experience power headroom (PHR) issues. PHR indicates how much transmission power remains for a wireless device or UE in addition to the power being used by current transmission. A wireless access point may use PHR measurement reports to determine how much uplink bandwidth a UE can use in a specific subframe before coaxing out the transmission power limit. As the UE uses more resource blocks, more transmission power is used and a lower amount of PHR is available.

In cases of high noise and low PHR, quality of service (QOS) of a wireless device is likely to be negatively impacted. In order to avoid prolonged decreases in QOS or other performance parameters, wireless devices send channel status information (CSI) reports to an access node in the network. The CSI report tells the access node how good or bad a channel is at a specific time. The CSI report may contain for example, a channel quality indicator (CQI), a precoding matrix index (PMI), and a rank indicator (RI), CSI-RS Resource Indicator (CRI), SS/PBCH Resource Block Indicator (SSBRI), and layer indicator (LI) as well as other measurements. Often, the wireless devices report in a periodic or aperiodic manner configured by a higher layer. For example, the reporting protocol may be configured through a setting at the eNodeB or gNodeB.

In response to CSI reports, a network entity can attempt to properly perform modulation coding scheme (MCS) assignment and allocate and schedule resources for each of the wireless devices to positively impact performance. The network entity considers the number of number of resource blocks and MCS for each CQI value to properly allocate the resources for each of the wireless devices.

Under certain undesirable conditions, the wireless devices may have a need for increased frequency of reporting to the network entity in order to benefit from resource reallocation. Accordingly, a system is needed that will dynamically alter the stored reporting protocol by adjusting reporting frequency for adversely impacted wireless devices. Further, a system is needed that considers secondary and primary data paths when altering the reporting protocol. Further, there is a need for systems and methods that can improve overall resource utilization and improve performance within a wireless network.

OVERVIEW

Exemplary embodiments described herein include systems, methods, and processing nodes for dynamically adjusting a CSI reporting protocol for a wireless device communicating with an access node within an EN-DC wireless network. An exemplary method for dynamically adjusting the CSI reporting protocol for a wireless device operating in an EN-DC network includes identifying a power headroom value for the wireless device, comparing the power headroom value to a predetermined threshold, and adjusting the CSI reporting protocol for the wireless device on a primary path when the power headroom value satisfies the predetermined threshold by increasing a CSI reporting frequency on the primary path. Exemplary embodiments further include reducing the CSI reporting frequency for the wireless device on a secondary path.

Additional exemplary embodiments include a processing node configured to perform multiple operations. The operations include identifying a primary path and a secondary path for a wireless device in a network. The operations further include identifying a power headroom value for the wireless device and comparing the power headroom value to a predetermined threshold. The operations additionally include adjusting a CSI reporting protocol for the wireless device on the primary path when the power headroom value satisfies the predetermined threshold by increasing a CSI reporting frequency on the primary path. Exemplary embodiments may additionally include reducing CSI reporting frequency for the wireless device on the secondary path.

Exemplary embodiments further include a system for dynamically adjusting the CSI reporting protocol for a wireless device operating in an EN-DC network. The system includes a processing node and a processor coupled to the processing node configured to perform multiple operations. The operations include identifying a power headroom value for the wireless device, comparing the power headroom value to a predetermined threshold, and adjusting the CSI reporting protocol for the wireless device on a primary path when the power headroom value satisfies the predetermined threshold by increasing a CSI reporting frequency on the primary path. Embodiments additionally include reducing CSI reporting frequency to the access node for the wireless device on a secondary path.

DETAILED DESCRIPTION

Figure 1:
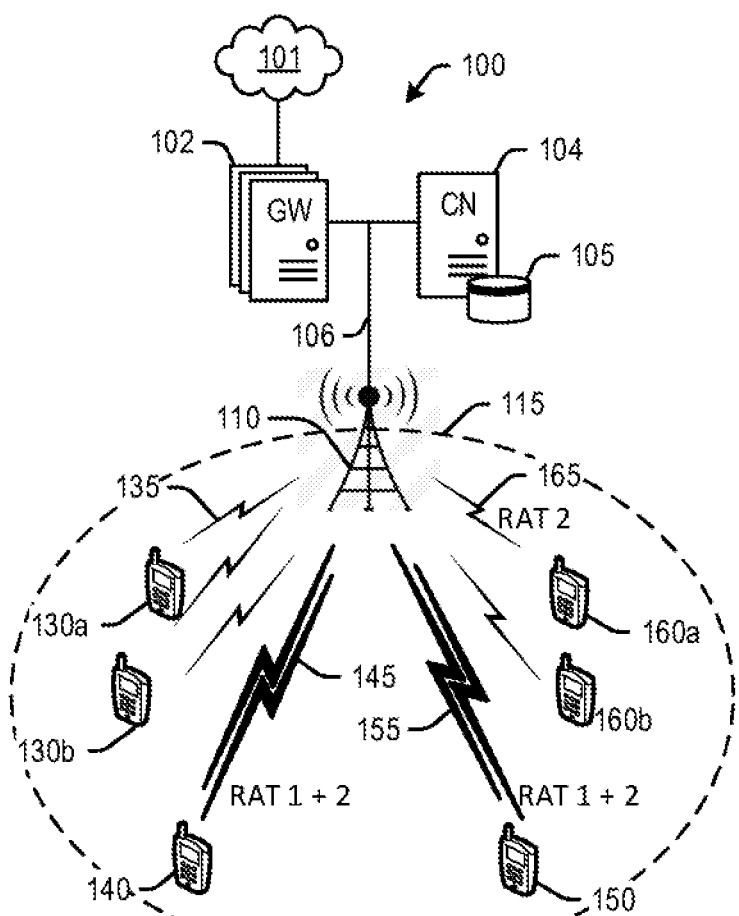
FIG. 1 depicts an exemplary system for wireless communication, in accordance with the disclosed embodiments.

Exemplary embodiments described herein include systems, methods, and processing nodes for dynamically adjusting a CSI reporting protocol. Embodiments operate in networks utilizing a 5G NR technology. Embodiments further encompass networks utilizing an EN-DC architecture, which allows devices to access both LTE and 5G simultaneously on the same spectrum band. Other network configurations are within scope of the disclosure.

In embodiments disclosed herein, a cell or wireless network may be provided by an access node. The access node may utilize one or more antennas to communicate with wireless devices or UEs. Performance at a particular wireless device may be dependent on a number of factors including, for example, PHR values of wireless devices and noise within a cell or a sector. PHR and SINR may be periodically reported by the wireless devices over a communication network to an access node. Additional signal performance parameters may be reported, including, for example, received signal strength indicator (RSSI), channel quality indicator (CQI), and rank index (RI).

Wireless devices may send CSI reports to the access node so that the access node can respond by scheduling resources, reconfiguring MCS assignment, allocating quadrature amplitude modulation (QAM) or taking other appropriate action to improve performance. CSI reporting can be configured as periodic or aperiodic at the access node. Embodiments proposed herein dynamically alter the static setting at the access node such that a periodic setting may become aperiodic or the frequency of a periodic setting may be changed. Because a low PHR can lead to poor performance, embodiments provided herein monitor the PHR and dynamically adjust CSI reporting frequency so that the access node can schedule resources and/or take other appropriate actions more frequently when PHR is low.

Some embodiments disclosed herein are particularly directed to dynamically adjusting CSI reporting for 5G EN-DC cells. Because 5G UEs are connecting to both an eNodeB and a gNodeB, the eNodeB experiences higher than normal levels of interference on the uplink because of the greater number of connected UEs. While dynamic adjustment of CSI reporting parameters aims to improve wireless device performance, the process of dynamic adjustment consumes resources such as physical resource blocks (PRBs) and also creates noise. The noise and the resources consumed by the process can be balanced with UE performance required. Thus, in order to avoid excessive consumption of resources and excessive noise, the dynamic adjustment process may be implemented only for UEs requiring high performance. Relay nodes are an example of UEs requiring high performance. Accordingly, embodiments disclosed herein determine if a UE requires high performance, for example by determining if the UE is capable of functioning as a relay node before implementing the dynamic adjustment process. In other embodiments, in addition to relay nodes, 5G capable UEs may be evaluated as requiring a high level of performance. UEs running certain applications may also indicate that a high level of performance is required.

Additional measures for reducing PRB consumption and noise while improving wireless device performance may include considering primary and secondary paths before dynamically adjusting CSI frequency. Wireless devices utilizing the EN-DC configuration may communicate over both a primary path and a secondary path. More data is transferred over the primary path than over the secondary path. In embodiments disclosed herein, the primary path may be over a first RAT, e.g, a 5G RAT, and the secondary path may be over a second RAT, e.g, a 4G RAT. Embodiments disclosed herein dynamically adjust the CSI reporting frequency for the wireless device over the primary path when the PHR satisfies a particular threshold. For example, if the PHR is low, reporting frequency over the primary path may be increased as reallocation of resources may become necessary in order to maintain a sufficiently high performance level. Further, to reduce noise, CSI reporting frequency over the secondary path may be reduced as reallocation of resources over the secondary path is likely not necessary to maintain adequate performance and a reduction in CSI reporting frequency reduces noise. Alternatively, for a given wireless device, the CSI reporting frequency over the secondary path may remain unchanged and the CSI reporting frequency over the primary path may be dynamically increased.

In exemplary embodiments, a processor or processing node associated with an access node may determine available PHR, compare PHR to a predetermined threshold and dynamically adjust the CSI reporting protocol for one or more wireless devices when the reported PHR satisfies the predetermined threshold. Accordingly, a solution as described herein alters the reporting protocol by increasing the CSI reporting frequency over the primary path, thereby enabling more frequent resource scheduling or other response by the processor or processing node based on the PHR to improve performance for one or more wireless devices. Embodiments disclosed herein further determine an existing CSI reporting periodicity for the wireless devices. If the reporting periodicity can be increased over the primary path, the system dynamically instructs the wireless device to increase its CSI reporting periodicity when signal performance parameters meet a predetermined threshold.

As explained above, while the increased CSI reporting frequency can result in improved performance, the increased CSI reporting frequency also results in increased consumption of resource blocks and excessive noise. Therefore, in accordance with embodiments disclosed herein, methods and systems both dynamically increase CSI reporting frequency on a primary path and dynamically decrease the CSI reporting frequency on the secondary path when the PHR for the wireless device satisfies the predetermined threshold.

Further, in embodiments disclosed herein, methods performed herein are performed only for wireless devices requiring high performance. Further, embodiments disclosed herein are performed only when both PHR and SINR satisfy predetermined thresholds. Once the system determines that the CSI reporting frequency can and should be changed, in embodiments disclosed herein, the system instructs the wireless device to change reporting frequency using a radio resource control (RRC) reconfiguration message.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for dynamically adjusting the CSI reporting protocol may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system for wireless communication. System 100 may be a wireless communication network, such as a cellular network. System 100 may include a communication network 101, a gateway 102, a controller node 104, and one or more access nodes 110. One or more end-user wireless devices may be directly connected to access node 110, such as end-user wireless devices 130a, 130b, 140, 150, 160a, and 160b.

In this exemplary embodiment, access node 110 may be a macrocell access node configured to deploy at least two different carriers, each of which utilizes a different RAT. For example, a first carrier may be deployed by access node 110 in an LTE mode, and a second carrier may be deployed by access node 110 in an NR mode. Thus, in an embodiment, access node 110 may comprise two co-located cells, or antenna/transceiver combinations that are mounted on the same structure. In some embodiments, multiple access nodes 110 may be deployed and each access node 110 may support a different RAT. For example, a gNodeB may support NR and an eNodeB may provide LTE coverage.

In embodiments disclosed herein, wireless devices may utilize one RAT as a primary path and another as a secondary path. The primary path may be used to transmit a larger quantity of data than the secondary path. The carriers may further utilize different frequency bands or sub-bands and additionally may be deployed using different types of multiplexing modes. In other embodiments, any other combination of access nodes and carriers deployed therefrom may be evident to those having ordinary skill in the art in light of this disclosure.

Wireless devices 130a, 130b, 140, 150, 160a, and 160b are illustrated as being in communication with access node 110 over various types of communication links. Each of the end-user wireless devices 130a, 130b, 140, 150, 160a, and 160b may be attached to the wireless air interface deployed by access node 110. Wireless links 135 and 165, as well as other wireless links that directly couple end-user wireless devices 140a, 140b, 140c, and 140d with access node 110, as shown in FIG. 1, form the wireless network (or wireless radio air interface) deployed by access node 110 within coverage area 115.

In disclosed embodiments, wireless devices 130a and 130b are illustrated as being in communication with access node 110 using a first RAT, which may provide, for example an NR communications link 135. The NR communication link 135 may comprise any communication channel that utilizes air-interface resources of an NR carrier deployed by access node 110. Wireless devices 160a and 160b may be in communication with the access node 110 over a second RAT, which may be for example, an LTE communications link 165 provided by any LTE carrier connected to the access node 110. Further, wireless devices 140 and 150 are illustrated as being in communication with access node 110 over communication links 145 and 155 respectively. The communication links 145 and 155 utilize a carrier aggregation operating mode, i.e. they utilize wireless air interface resources from more than one carrier. For example, communication link 145 may utilize air-interface resources of at least one carrier utilizing the first RAT and at least another carrier, including any alternative carrier that in accordance with embodiments disclosed herein is using a second RAT and is connected with the access node 110. In embodiments a primary path may utilize an NR carrier and a secondary path may utilize an LTE carrier. Other configurations are within scope of the disclosure.

Access node 110 may be any network node configured to provide communication between end-user wireless devices 130a, 130b, 140, 150, 160a, and 160b and communication network 101, including standard access nodes such as a macro-cell access node, a base transceiver station, a radio base station, an eNodeB device, an enhanced eNodeB device, a next generation NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that supports multiple frequency bands selected from 3 GHz to 100 GHz. In an exemplary embodiment, a macro-cell access node 110 may have a coverage area 115 in the range of approximately five kilometers to thirty-five kilometers and an output power in the tens of watts. In an embodiment, access node 110 may comprise two co-located cells, or antenna/transceiver combinations that are mounted on the same structure. Alternatively, access node 110 may comprise a short range, low power, small-cell access node such as a microcell access node, a picocell access node, a femtocell access node, or a home eNodeB device.

In other embodiments, any other combination of access nodes and carriers deployed therefrom may be evident to those having ordinary skill in the art in light of this disclosure.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 2.

Wireless devices 130a, 130b, 140, 150, 160a and 160b may be any device, system, combination of devices, or other such communication platform capable of communicating wirelessly with access node 110 using one or more frequency bands and wireless carriers deployed therefrom. Each of wireless devices 130a, 130b, 140, 150, 160a, 160b may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals and carrying data, for example, to support voice, push-to-talk, broadcast video, and data communications by end-user wireless devices 130a, 130b, 140, 150, 160a, and 160b. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations, improvements, or variations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a stand-alone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. The controller node 104 may further operate as an element management system that controls access nodes in the network 101. In this instance, the element management system may be operable to measure performance metrics and interference within the network 101. One of ordinary skill in the art would recognize that controller node 104 is not limited to any specific technology architecture, such as Long Term Evolution (LTE) or 5G NR and may be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as types and duplexing methods of carriers deployed by access node 110, power classes and carrier aggregation capabilities of wireless devices 130a, 130b, 140, 150, 160a, and 160b associations therebetween. This information may be requested by or shared with access node 110 via communication link 106, X2 connections, and so on. The database 105 may additionally store threshold values, such as for PHR and SINR. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Additionally, the nodes may include relay nodes or other nodes requiring high performance. Relay nodes improve service quality by relaying communication between an access node, and end-user wireless devices in the wireless network. For example, relay nodes may be used at the edge of a coverage area of an access node to improve coverage and/or service. Relay nodes may also be used in crowded areas that have a high number of other wireless devices to increase the available throughput experienced by the wireless devices being relayed. Relay nodes are generally configured to communicate with the access node (i.e., a "donor" access node) via a wireless backhaul connection. Relay nodes typically deploy a radio air-interface to which end-user wireless devices can attach. Donor access nodes generally comprise scheduling modules that schedule resources used by wireless devices connected directly to the donor access node and also schedule the wireless backhaul connections for the various relay nodes connected thereto. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
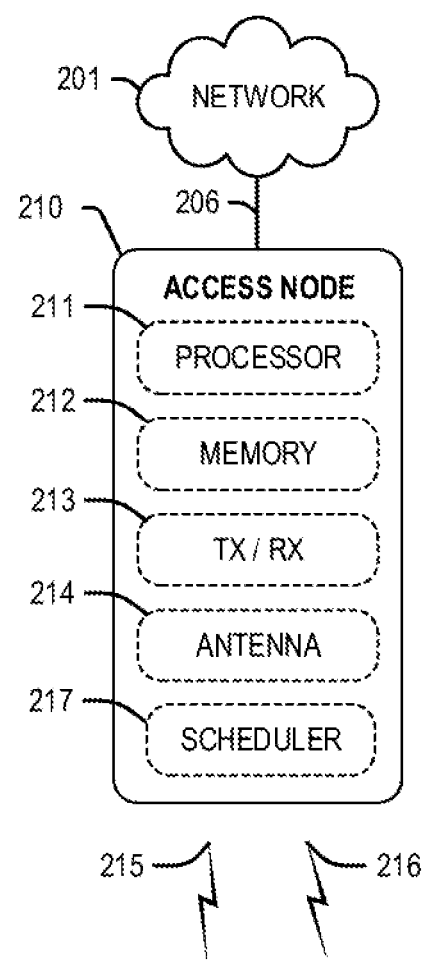
FIG. 2 illustrates an exemplary configuration of an access node in accordance with disclosed embodiments.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, transceiver 213, antenna 214, and scheduler 217. Processor 211 executes instructions stored on memory 212, while transceiver 213 and antenna 214 enable wireless communication with other network nodes, such as wireless devices and other nodes. For example, access node 210 may be configured to determine whether PHR satisfies a threshold and to dynamically instruct wireless devices to change CSI reporting frequency in response to the detection. Scheduler 217 may be provided for scheduling resources based on the CSI reports. These features may be enabled by access node 210 comprising two co-located cells, or antenna/transceiver combinations that are mounted on the same structure. Network 201 may be similar to network 101 discussed above. The wireless devices may operate in carrier aggregation mode, during which a wireless device utilizes more than one carrier, enabling the wireless devices to communicate with access node 210 using a combination of resources from multiple carriers. Further, instructions stored on memory 212 can include instructions for dynamically adjusting CSI reporting frequency on primary and secondary paths, which will be further explained below with reference to FIGS. 4-6.

Figure 3:
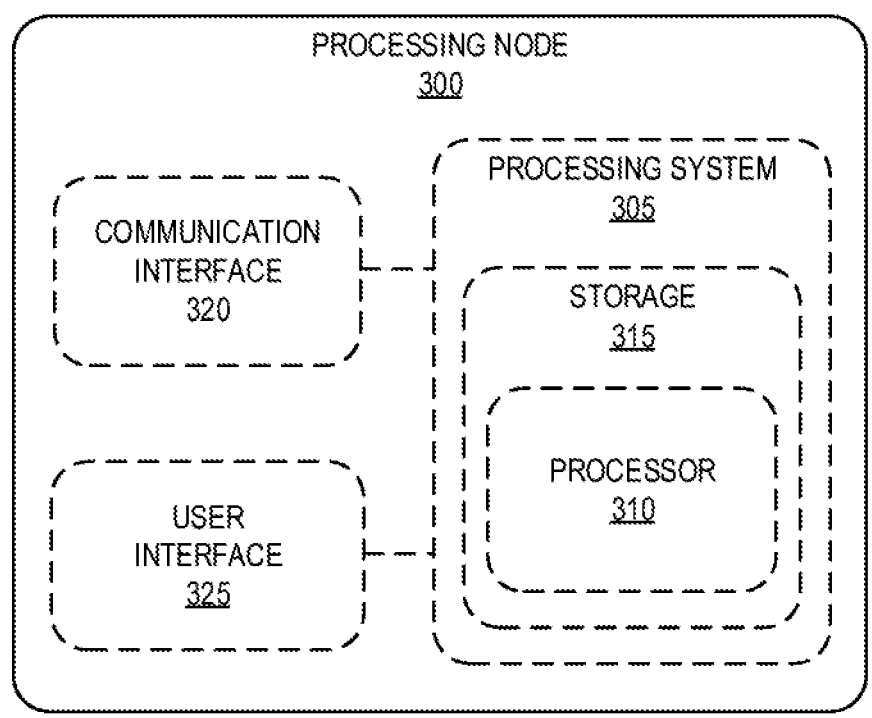
FIG. 3 depicts a processing node in accordance with disclosed embodiments.

FIG. 3 depicts an exemplary processing node 300, which may be configured to perform the methods and operations disclosed herein dynamically adjusting a CSI reporting protocol in order to improve performance in a wireless network. In some embodiments, processing node 300 may be included in an access node, such as access node 110 or 210. In further embodiments, processing node 300 may be included in controller node 104 and may be configured for controlling the access nodes.

Processing node 300 may be configured for dynamically adjusting the CSI reporting protocol in the network as set forth above. The adjustment of CSI reporting protocol may be performed dynamically in real time based on a threshold comparison in a network, such as the network 101. Processing node 300 may include a processing system 305. Processing system 305 may include a processor 310 and a storage device 315. Storage device 315 may include a disk drive, a flash drive, a memory, or other storage device configured to store data and/or computer readable instructions or codes (e.g., software). The computer executable instructions or codes maybe accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. Processor 310 may be a microprocessor and may include hardware circuitry and/or embedded codes configured to retrieve and execute software stored in storage device 315.

Processing node 300 may include a communication interface 320 and a user interface 325. Communication interface 320 may be configured to enable the processing system 305 to communicate with other components, nodes, or devices in the wireless network. Communication interface 320 may include hardware components, such as network communication ports, devices, routers, wires, antenna, transceivers, etc. User interface 325 may be configured to allow a user to provide input to processing node 300 and receive data or information from processing node 300. User interface 325 may include hardware components, such as touch screens, buttons, displays, speakers, etc. Processing node 300 may further include other components such as a power management unit, a control interface unit, etc.

Figure 4:
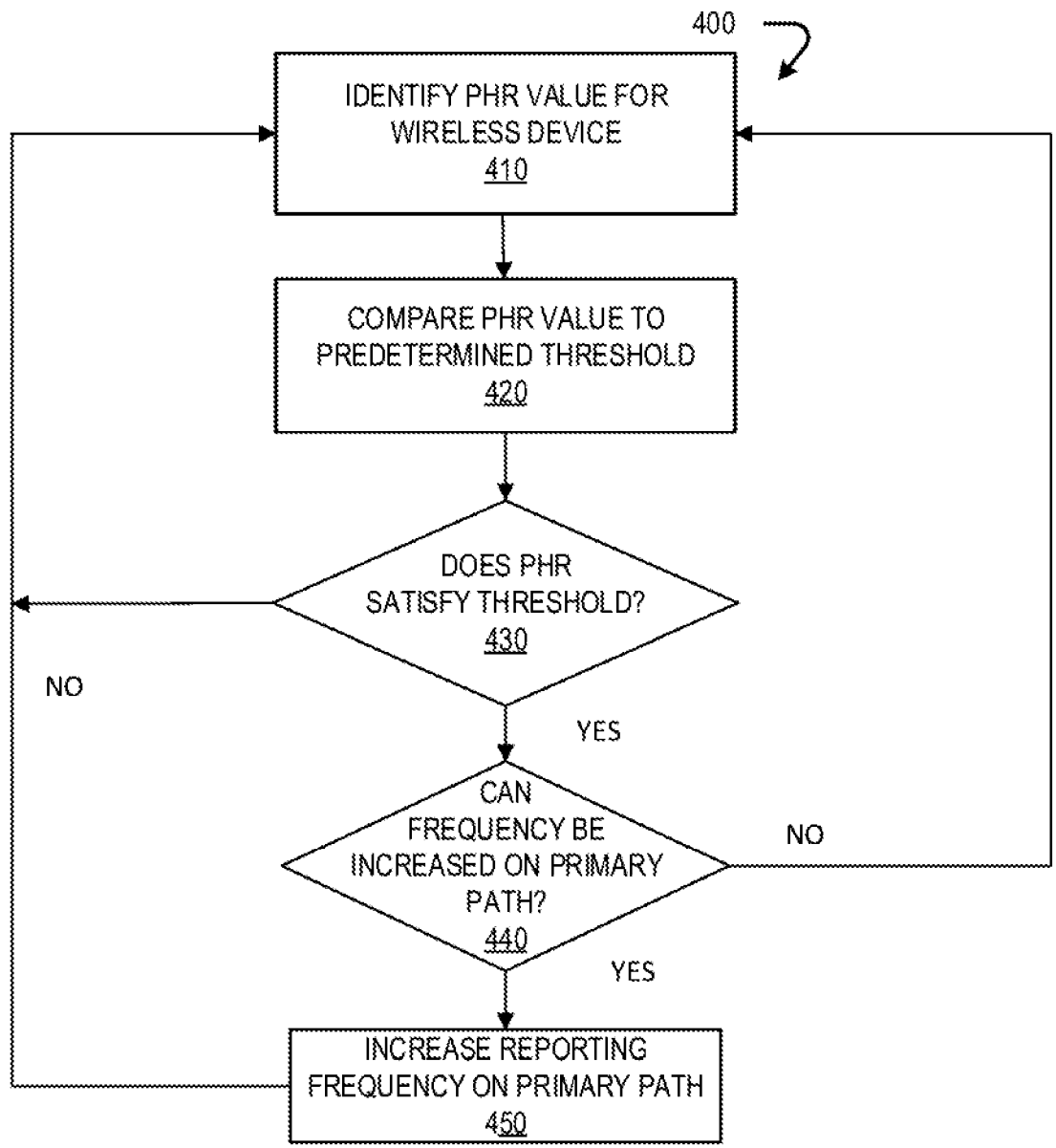
FIG. 4 depicts a method for dynamically adjusting a CSI reporting protocol in accordance with the disclosed embodiments.

The disclosed methods for dynamically adjusting the CSI reporting protocol are discussed further below. FIG. 4 illustrates an exemplary method 400 for dynamically adjusting the CSI reporting protocol for a wireless device in a network. Method 400 may be performed by any suitable processor discussed herein, for example, a processor included in access node 110, 210, or 310, included in processing node 300, or a processor included in controller node 104. For discussion purposes, as an example, method 400 is described as being performed by a processor included in access node 110.

Method 400 starts in step 410 and the access node 110 may determine a PHR value for a wireless device. In embodiments described herein, the access node 110 may determine the PHR value for all wireless devices in the network, in a sector, or within a particular coverage area. The PHR may be measured by the wireless devices and may be reported from the wireless devices to the access node 110. In some instances, the PHR may be measured by the access node and stored in a database.

In step 420, the access node 110 compares the PHR value to a predetermined threshold. For example, a threshold may be selected for PHR based on an expected drop in wireless performance at the threshold level. If PHR meets a certain threshold level, then the expected performance for the wireless device may be deemed insufficient. The threshold value ma be predetermined and may be stored, for example, in the database 105.

If the PHR does not satisfy the predetermined threshold in step 430, the access node 110 returns to monitoring PHR values in step 410. If the PHR value satisfies the threshold in step 430, the access node 110 determines if the CSI reporting frequency can be increased on the primary path in step 440. This determination may include comparing the existing CSI reporting frequency to a stored maximum CSI reporting frequency. The existing reporting frequency may be stored in the database 105 or table at the access node. Minimum and maximum reporting frequencies may also be set at the access node and stored in a database. To determine if the CSI reporting frequency can be increased, the access node 110 can compare the existing frequency with the maximum frequency stored in the database. If the CSI reporting frequency on the primary path can be increased, the access node 110 instructs the wireless device to increase the CSI reporting frequency on the primary path in step 450.

The increase in reporting frequency of the wireless device when PHR satisfies the threshold enables more frequent reallocation of resources in order to enhance performance of the wireless device. In order to increase the reporting frequency, the access node may instruct the wireless device having PHR satisfying the predetermined threshold to increase its CSI reporting frequency through an RRC reconfiguration message or other message directed specifically to the wireless device. Additionally, because the adjustment to the CSI reporting protocol occurs dynamically, the method can transform a periodic reporting scheme to an aperiodic reporting scheme based on the monitored signal performance parameters.

Figure 5:
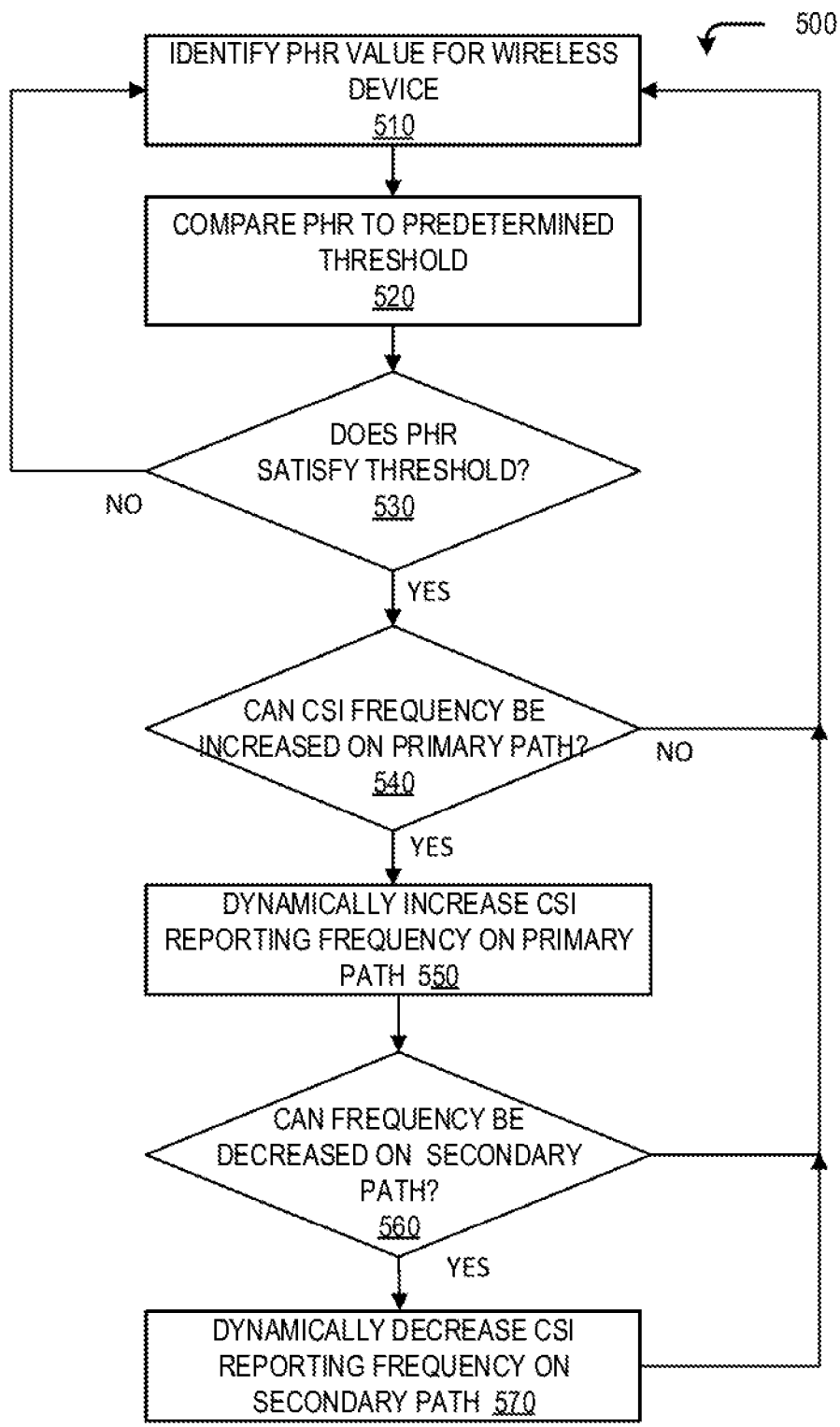
FIG. 5 depicts an exemplary method for dynamically adjusting a CSI reporting protocol on both primary and secondary paths.

FIG. 5 depicts an exemplary method 500 for dynamically adjusting the CSI reporting protocol for wireless devices communicating over a primary path and a secondary path. Method 500 may be performed by any suitable processor discussed herein, for example, a processor included in access node 110, or 210, or processor 310 included in processing node 300, or a processor included in controller node 104. For discussion purposes, as an example, method 500 is described as being performed by a processor included in access node 110.

In step 510, the access node 110 identifies a PHR value for one or more wireless devices. The PHR value may, for example, be received in a report from the wireless device. In step 520, the access node 110 compares the PHR value to a predetermined threshold. The threshold may be predetermined and may be retrieved, for example, for the database 105. In step 530, the access node determines if the PHR value satisfies the predetermined threshold. If, in step 530, the PHR value does not satisfy the predetermined threshold, the access node 110 returns to monitoring in step 510.

If the PHR value does satisfy the predetermined threshold in step 530, the access node 110 determines if the CSI reporting frequency can be increased on the primary path for the wireless device in step 540. The determination can be made, for example, based on a maximum reporting frequency stored in the database 105. If the CSI reporting frequency cannot be increased on the primary path in step 540, the access node returns to monitoring in step 510. However, if the CSI reporting frequency can be increased on the primary path in step 540, the access node dynamically increases the CSI reporting frequency on the primary path in step 550. The access node 110 may, for example, send an RRC reconfiguration message to the wireless device instructing the wireless device to increase the reporting frequency.

In step 560, the access node 110 determines if the CSI reporting frequency can be decreased on the secondary path for the wireless device. This determination can be made, for example, by comparing the existing CSI reporting frequency to a stored predetermined minimum CSI reporting frequency. The minimum reporting frequency may be stored, for example, in the database 105.

If the CSI reporting frequency cannot be decreased on the secondary path in step 560, the access node returns to monitoring in step 510. However, if the CSI reporting frequency can be decreased on the secondary path in step 560, the access node 110 dynamically decreases the CSI reporting frequency of the wireless device on the secondary path in step 570.

Thus, the method aims to provide dynamic CSI reporting protocol adjustment, particularly in an EN-DC 5G NR cell. Reporting for each path would be independent of reporting on the other path and may be based on a PHR report from each wireless device. Typically reporting over the primary path will become more frequent than reporting over the secondary path. Thus, for example, a single wireless device may perform CSI reporting every 20 ms on the primary path and every 40 ms on the secondary path.

Figure 6:
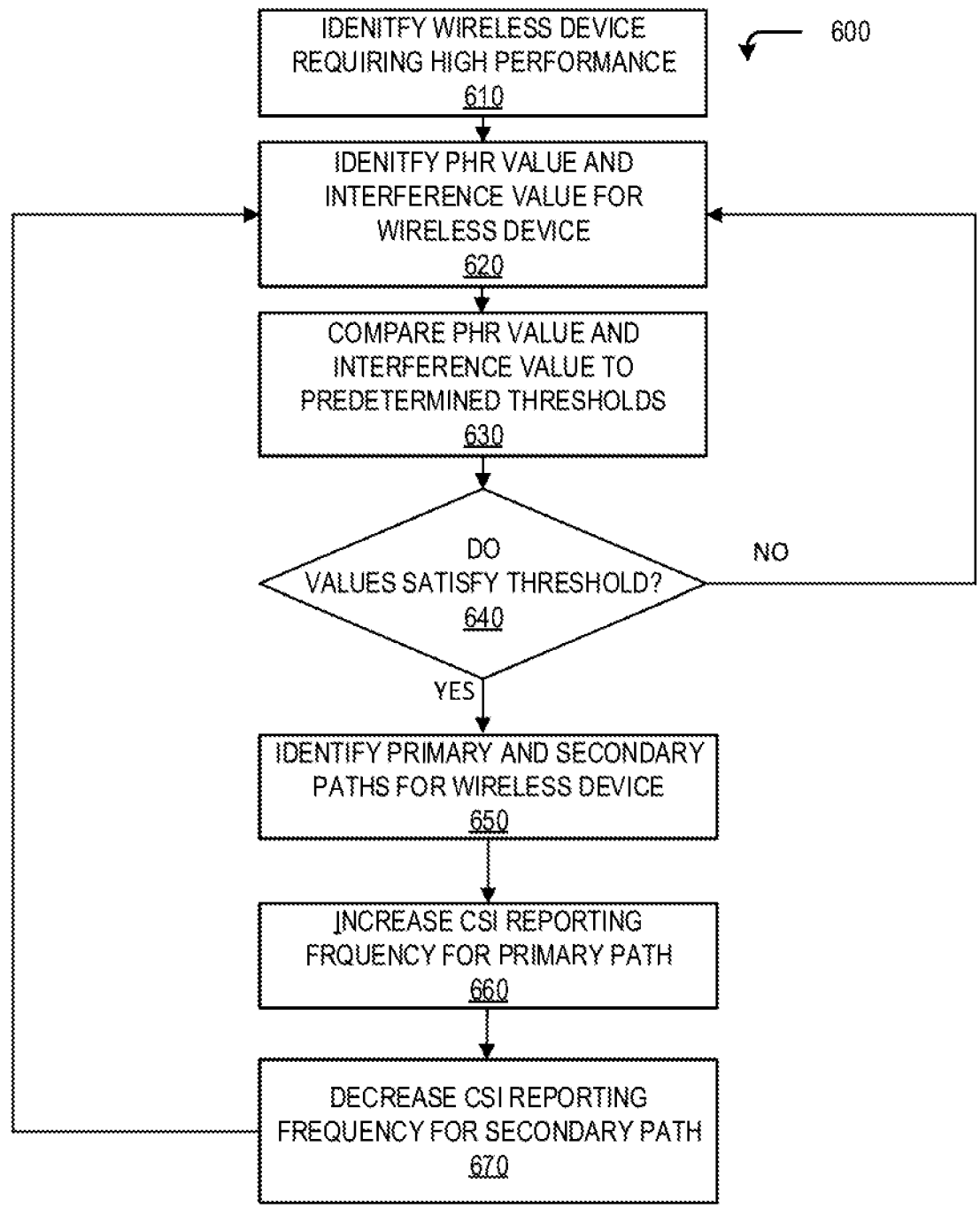
FIG. 6 depicts another exemplary method for dynamically adjusting a CSI reporting protocol for high performance devices on primary and secondary paths.

FIG. 6 illustrates a method 600 for dynamically adjusting the CSI reporting protocol for a wireless device in a network. Method 600 may be performed by any suitable processor discussed herein, for example, a processor included in access node 110, 210, or processor 310 included in processing node 300, or a processor included in controller node 104. For discussion purposes, as an example, method 600 is described as being performed by a processor included in access node 110.

In step 610, the access node 110 identifies wireless devices requiring high performance. For example, wireless devices running certain applications or wireless devices functioning as relay nodes may require high performance. The access node performs step 610 in order to avoid performing the remaining method steps for all wireless device in the network. Due to limited resources and more noise created by increasing reporting frequency, it may be desirable to limit the remaining method steps to operate specifically for wireless devices requiring high performance. The access node 110 may identify the wireless devices requiring high performance based on reports sent by the wireless devices to the access node or based on information stored in a database available to the access node.

For those devices requiring high performance in step 610 the access node identifies a PHR value and an interference value for the wireless device in step 620. The interference value may be identified based on SINR reported by the wireless device. In step 630, the access node 110 compares the interference value and PHR value to predetermined thresholds. If the values do not satisfy the thresholds in step 640, the access node 110 continues to monitor the values in step 620. If the values do satisfy the thresholds in step 640, the access node 110 identifies secondary and primary paths for the wireless device in step 650 based on the amount of data transmitted over each path. In step 660, the access node 110 increases the CSI reporting frequency for the wireless device on the primary path. The access node may send a message to the wireless device directing it to report more frequently. For example, the access node may direct the wireless device to send a CSI reporting message or updated CSI reporting more frequently than previously. If impacted wireless device had been sending every 40 ms, then the access node 110 may direct the wireless device to increase reporting to every 25 ms or 30 ms. The increased reporting for high performance UEs such as relays enables the access node to make better decisions regarding MCS assignment and QAM allocation, to improve overall network performance.

In step 670, the access node 110 decreases CSI reporting frequency for the secondary path. Because of the increased noise created by the increased reporting frequency on the primary path, the decrease in CSI reporting frequency on the secondary path is advantageous as it decreases noise and minimizes reporting on the lesser used path where additional resource allocation is unnecessary.

While the method of FIG. 4 aims to dynamically increase CSI reporting frequency on a primary path for a wireless device having low PHR, the methods of FIGS. 5 and 6 also illustrates the process of dynamically adjusting the CSI reporting frequency in both directions. Because increased reporting frequency consumes resources it may be desirable to lower the frequency of reporting on the secondary path. Dynamically decreasing the reporting frequency will allow effective and efficient distribution of network resources.

In some embodiments, methods 400, 500, and 600 may include additional steps or operations. Furthermore, the methods may include steps shown in each of the other methods. As one of ordinary skill in the art would understand, the methods 400, 500, and 600 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dynamically adjusting a channel state information (CSI) reporting protocol for a wireless device operating in an EN-DC network, the method comprising:
   identifying a primary path and a secondary path for the wireless device, wherein the wireless device transmits data over both the primary and secondary paths and a volume of data transmitted over the primary path is greater than a volume of data transmitted over the secondary path, wherein the CSI reporting protocol exists for reporting on the primary path and the secondary path;
   identifying a power headroom value for the wireless device;
   comparing the power headroom value to a predetermined threshold; and
   adjusting the CSI reporting protocol for the wireless device on the primary path when the power headroom value satisfies the predetermined threshold by increasing a CSI reporting frequency on the primary path, such that the CSI reporting protocol for the wireless device on the primary path is different from the CSI reporting protocol for the wireless device on the secondary path and CSI reporting for the wireless device occurs periodically on both the primary path and the secondary path.

2. The method of claim 1, further comprising reducing the CSI reporting frequency for the wireless device on the secondary path.

3. The method of claim 1, further comprising sending an RRC reconfiguration message to the wireless device instructing the wireless device to report in accordance with the adjusted CSI reporting protocol.

4. The method of claim 1, further comprising determining a SINR value for the wireless device and determining the adjustment to the CSI reporting protocol based on SINR.

5. The method of claim 2, wherein more data packets are sent over the primary path than the secondary path.

6. The method of claim 1, wherein the primary path comprises a 5G NR RAT.

7. The method of claim 2, wherein the secondary path comprises a 4G LTE RAT.

8. The method of claim 1, further comprising determining if the wireless device requires high performance and adjusting the CSI reporting protocol only when the wireless device requires high performance.

9. A system for dynamically adjusting a channel state information (CSI) reporting protocol for a wireless device operating in an EN-DC network:
   a processing node; and
   a processor coupled to the processing node configured to perform operations comprising:
   identifying a primary path and a secondary path for the wireless device, wherein the wireless device transmits data over both the primary and secondary paths and a volume of data transmitted over the primary path is greater than a volume of data transmitted over the secondary path, wherein the CSI reporting protocol exists for reporting on the primary path and the secondary path;
   identifying a power headroom value for the wireless device;
   comparing the power headroom value to a predetermined threshold; and
   adjusting the CSI reporting protocol for the wireless device on a primary path when the power headroom value satisfies the predetermined threshold by increasing a CSI reporting frequency on the primary path, such that the CSI reporting protocol for the wireless device on the primary path is different from the CSI reporting protocol for the wireless device on the secondary path and CSI reporting for the wireless device occurs periodically on both the primary path and the secondary path.

10. The system of claim 9, further comprising reducing CSI reporting frequency for the wireless device on the secondary path.

11. The system of claim 9, further comprising sending an RRC reconfiguration message to the wireless device instructing the wireless device to report in accordance with the adjusted CSI reporting protocol.

12. The system of claim 9, further comprising determining a SINR value for the wireless device and determining the adjustment to the CSI reporting protocol based on SINR.

13. The system of claim 10, wherein more data packets are sent over the primary path than the secondary path.

14. The system of claim 9, wherein the primary path comprises a 5G NR RAT.

15. The system of claim 14, wherein the secondary path comprises a 4G LTE RAT.

16. A processing node configured to perform operations comprising:
   identifying a primary path and a secondary path for a wireless device in a network, wherein the wireless device transmits data over both the primary and secondary paths and a volume of data transmitted over the primary path is greater than a volume of data transmitted over the secondary path, wherein the CSI reporting protocol exists for reporting on the primary path and the secondary path;
   identifying a power headroom value for the wireless device;
   comparing the power headroom value to a predetermined threshold; and
   adjusting a CSI reporting protocol for the wireless device on the primary path when the power headroom value satisfies the predetermined threshold by increasing a CSI reporting frequency on the primary path, such that the CSI reporting protocol for the wireless device on the primary path is different from the CSI reporting protocol for the wireless device on the secondary path and CSI reporting for the wireless device occurs periodically on both the primary path and the secondary path.

17. The processing node of claim 16, further performing operations comprising reducing CSI reporting frequency for the wireless device on the secondary path.

18. The processing node of claim 16, wherein the network is an EN-DC network.

19. The processing node of claim 16, wherein more data packets are sent over the primary path than the secondary path.

20. The processing node of claim 16, wherein the primary path comprises a 5G NR RAT and the secondary path comprises a 4G LTE RAT.

* * * * *